(12) United States Patent
Kajiura et al.

(10) Patent No.: US 7,887,773 B2
(45) Date of Patent: Feb. 15, 2011

(54) METHOD FOR TREATING CARBON NANOTUBES, CARBON NANOTUBES AND CARBON NANOTUBE DEVICES

(75) Inventors: Hisashi Kajiura, Tokyo (JP); Yongming Li, Tokyo (JP); Hongliang Zhang, Beijing (CN); Yunqi Liu, Beijing (CN); Lingchao Cao, Beijing (CN); Xianglong Li, Beijing (CN); Dacheng Wei, Beijing (CN); Yu Wang, Beijing (CN); Dachuan Shi, Beijing (CN)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 12/270,019

(22) Filed: Nov. 13, 2008

(65) Prior Publication Data

US 2009/0142251 A1 Jun. 4, 2009

(30) Foreign Application Priority Data

Nov. 29, 2007 (CN) .................... 2007 1 0196650

(51) Int. Cl.
*D01F 9/12* (2006.01)
(52) U.S. Cl. .................... 423/447.1; 423/460; 977/845; 977/847
(58) Field of Classification Search .............. 423/447.1, 423/447.2, 445 B, 460, 278, 289, 292, 293, 423/385, 395, 400, 405, 447.3, 447.4, 447.7; 977/742, 745, 748, 750, 752, 842, 847, 888, 977/904, 906, 932, 936, 938, 939, 948, 952, 977/734, 737, 740, 741, 743, 749, 751, 845, 977/848

See application file for complete search history.

(56) References Cited

U.S. PATENT DOCUMENTS

| | | | |
|---|---|---|---|
| 2004/0018416 A1* | 1/2004 | Choi et al. | 429/44 |
| 2007/0041889 A1* | 2/2007 | Hwang | 423/447.6 |
| 2008/0102020 A1* | 5/2008 | Niu et al. | 423/447.1 |
| 2008/0277627 A1* | 11/2008 | Veedu et al. | 252/503 |

OTHER PUBLICATIONS

Arnold, Michael S. et al., "Sorting carbon nanotubes by electronic structure using density differentiation," Nature Nanotechnology, vol. 1, pp. 60-65, 2006.
Chen, Zhihong et al., "Bulk Separative Enrichment in Metallic or Semiconducting Single-Walled Carbon Nanotubes," Nano Letters, vol. 9, pp. 1245-1249, 2003.
Collins, Philip G. et al., "Engineering Carbon Nanotubes and Nanotube Circuits Using Electrical Breakdown," Science, vol. 292, pp. 706-709, 2001.
Krupke, Ralph et al., "Separation of Metallic from Semiconducting Single-Walled Carbon Nanotubes," Science, vol. 301, pp. 344-347, 2003.
Maeda, Yutaka et al., "Dispersion and Separation of Small-Diameter Single-Walled Carbon Nanotubes," J. Am. Chem. Soc., vol. 128, pp. 12239-12242, 2006.
Zhuang, Guangyu et al., "Selective Etching of Metallic Carbon Nanotubes by Gas Phase Reaction," Science, vol. 314, pp. 974-977, 2006.

* cited by examiner

*Primary Examiner*—Stuart Hendrickson
*Assistant Examiner*—Brittany M Martinez
(74) *Attorney, Agent, or Firm*—K&L Gates LLP

(57) ABSTRACT

A method for treating carbon nanotubes is provided. In the method for treating carbon nanotubes (CNTs), the CNTs are treated with $SO_3$ gas at an elevated temperature, for example, at a temperature in the range of 385° C. to 475° C.

12 Claims, 8 Drawing Sheets

METHOD FOR TREATING CARBON NANOTUBES, CARBON NANOTUBES AND CARBON NANOTUBE DEVICES

CROSS REFERENCES TO RELATED APPLICATIONS

The present application claims priority to Chinese Patent Application CN 200710196650.8 filed in the Chinese Patent Office on Nov. 29, 2007, the entire contents of which is being incorporated herein by reference.

BACKGROUND

The present application relates to a method for treating carbon nanotubes (CNTs), treated CNTs, and a CNT device using the treated CNTs.

As one-dimensional nano-material, CNTs are of many excellent electrical, mechanical, and chemical properties, and therefore have attracted increasing attention. With the continuing study on this nano-material, the potential various application for the CNTs are continuously arising. For example, the CNTs can be applied in the fields of electronics, optics, mechanics, biotechnology, and ecology, and used in, for example, a nano-field effect transistor, a field emission source, a hydrogen storage material, a high strength fiber, a sensor, and the like.

CNTs can be classified as single-walled carbon nanotubes (SWNTs) and multi-walled carbon nanotubes (MWNTs) according to the number of the carbon atom layers forming the wall, wherein the MWNTs may be considered as being formed by nesting the SWNTs with different diameters. In research and application, the SWNTs and the MWNTs with relatively small number of atom layers are of importance due to the outstanding performance.

CNTs can also be classified as metallic CNTs and semiconducting CNTs according to their conductivity, in which the former for example can be used in field emission source, electrode materials and the like, and the latter for example can be used in nano-filed effect transistors, sensors and the like. In Saito R et al, *Material Science and Engineering*, 1993, B19: 185 to 191, Saito et al. have through theoretical analysis concluded that according to the diameter and chiral angle of the SWNTs, about 1/3 of SWNTs are metallic and the other 2/3 are semiconducting. Due to the various preparing condition, purifying treatment and the like, the ratio of the two types of CNTs may not be strictly consistent with the above theoretical value in the actual prepared product. With the increase of the number of the carbon atom layers, the metallicity of the CNTs gradually increases and at last the CNTs become pure metallic.

The conventional methods for preparing the CNTs include graphite arc-discharging, chemical vapor deposition, laser evaporation and the like. The CNTs obtained through these methods normally include both metallic CNTs and semiconducting CNTs that are mixed together. Therefore, one of the prerequisite for the metallic and semiconducting CNTs being put into application is to separate the CNTs with the different conductivity from each other in the prepared product. Hence, the separation of the CNTs has become one of the important topics in the research.

Currently, many methods using the difference in chemical and physical properties between the metallic and semiconducting CNTs to separate the CNTs have been proposed. For example, in "*Engineering Carbon Nanotubes and Nanotube Circuits Using Electrical Breakdown*," Philip G. Collins, et al, *Science* 2001, 292, 706-709, Collins et al proposed an electrical breakdown method; in "*Selective Etching of Metallic Carbon Nanotubes by Gas Phase Reaction*," Guangyu Zhuang, et al, *Science* 10 Nov. 2006: 974-977, Zhang et al proposed a methane plasma treatment method, in which the metallic CNTs were etched during reaction and the semiconducting CNTs were remained; in "*Bulk Separative Enrichment in Metallic or Semiconducting Single-Walled Carbon Nanotubes*," Zhihong Chen, et al, *Nano Lett.*, 2003, 3(9), pp 1245-1249 and in "*Dispersion and separation of Small-Diameter Single Walled Carbon Nanotubes*," Yutaka Maeda, et al, *J. Am. Chem. Soc.*, 2006, 128(37) pp 12242, Chen et al and Maeda et al proposed selective absorption methods, respectively; in "*Separation of Metallic from Semiconducting Single-Walled Carbon Nanotubes*," Ralph Krupke, et al, *Science* 18 Jul. 2003:344-347, Krupke et al proposed an electrophoresis method; and in "*Sorting carbon nanotubes by electronic structure using density differentiation*," Michael S. Arnold, et al, *Nat. Nanotechnol.*, 2006, 1, pp 60-65, Arnold et al proposed a density gradient centrifugation method.

SUMMARY

However, there are still needs for the methods for treating CNTs to modify the characteristics more effective, for example, for the methods to separate the metallic and semiconducting CNTs more effectively and in large scale or to obtain the CNTs with certain diameters.

The present application provides, in an embodiment, a method for treating CNTs using selective etching gases. The treatment may be performed at an elevated temperature. These selective etching gases can selectively remove the CNTs according to the CNTs' characteristics and hence enrich the CNTs with certain characteristics. Such CNTs' characteristics include the conductivity, the diameter of carbon nanotubes and the like. The selective etching gases may be, for example, sulfur trioxide ($SO_3$) gas or nitrogen oxide ($N_xO_y$) gas.

In the method for treating CNTs according to an embodiment, the CNTs are treated at an elevated temperature using $SO_3$ gas.

Preferably, the elevated temperature may be in a range of 385° C. to 475° C., and more preferably 400° C. to 450° C., and the most preferably 410° C. to 440° C., for example, 413° C., 425° C., and 437° C.

Preferably, the treating time may be in a range of 10 minutes to 2 hours, and more preferably 30 minutes to 1 hour, for example, 45 minutes.

Preferably, before the treating is performed, oxygen may be excluded outside the reaction zone for example by vacuum-pumping so that the CNTs may be treated under the condition substantially without oxygen.

Preferably, after the gas reaction treatment with $SO_3$, the treated CNTs may be further annealed so as to remove $SO_3$ adsorbed on the wall of the remaining CNTs and repair the defects on the wall. The anneal treatment may be preferably performed at a temperature in a range of 800° C. to 1000° C., and the time may be in a range of 10 to 30 minutes.

In the method for treating CNTs according to an embodiment, the treated CNTs may be preferably SWNTs or DWNTs (Double-Walled Nanotubes). Furthermore, the diameter of the SWNTs may be preferably less than 1 nm.

In the method for treating CNTs according to an embodiment, the partial pressure of the $SO_3$ gas in the reaction zone is preferably 8% to 30%.

The method for treating CNTs according to an embodiment can control the conductivity of the CNTs effectively, by making the content of the metallic CNTs especially those with small diameter increase, so that the CNTs can be used for preparing CNTs device.

In the treating method according to another embodiment, the CNTs are treated at an elevated temperature using nitrogen oxide ($N_xO_y$) gas. Preferably, the nitrogen oxide ($N_xO_y$) gas may be nitrogen monoxide, nitrogen dioxide or a mixture gas thereof.

In an embodiment, the present application provides CNTs that are treated with a selective etching gas. Preferably, the CNTs are treated at an elevated temperature with $SO_3$ gas.

In another embodiment, the present application provides a CNT device comprising CNTs that are treated with selective etching gas. Preferably, the CNTs are treated at an elevated temperature using $SO_3$ gas.

Preferably, the CNT device includes, for example, CNT conductive film, field emission source, transistor, conductive wire, electrode material (e.g., transparent, porous or gas diffusing electrode material), nano electro-mechanic system (NEMS), nano cantilever, quantum computing device, lighting emitting diode, solar cell, surface-conduction electron-emitter display, filter (e.g., high-frequency or photonic band), drag delivery system, thermal conductive material, nano nozzle, energy storage material (e.g., hydrogen storage material), fuel cell, sensor (e.g., gas, glucose, or ion sensor), or catalyst support material.

In yet another embodiment, the present application provides a CNT device comprising CNTs that are treated with planar molecular gas. Preferably, the CNTs are treated at an elevated temperature using $SO_3$ gas with a planar molecular.

Additional features and advantages are described herein, and will be apparent from the following Detailed Description and the figures.

DETAILED DESCRIPTION

The embodiment of the present application will be described with reference to the accompanying drawings.

An embodiment of the present application provides a method for treating CNTs using selective etching gas, and the method may be performed at an elevated temperature. The selective etching gases can selectively treat the CNTs according to the CNTs' characteristics and hence enrich the CNTs with certain characteristic. Such characteristics include conductivity, diameter, and the like of the CNTs. CNTs with increased ratio of metallic ones can be obtained through the treatment. In addition, the treatment method according to the embodiment can be used for purifying CNTs to remove the impurities such as amorphous carbon, carbon nanoparticles and other debris that may be produced during the preparation of the CNTs. The selective etching gas includes sulfur trioxide ($SO_3$) gas or nitrogen oxide ($N_xO_y$) gas.

The CNTs with increased ratio of metallic CNTs obtained with the above method can be used for fabricating CNT devices, for example, CNT conductive film, field emission source and the like.

The First Embodiment

The first embodiment relates to the method for treating CNTs at an elevated temperature using $SO_3$ gas. The ratio of the metallic CNTs in the treated CNTs is increased by the elevated temperature treatment with $SO_3$ gas, and the separation of the metallic CNTs and the semiconducting CNTs is realized. The method of the first embodiment particularly enriches the metallic SWNTs with small diameter. The CNTs treated by the method of the first embodiment can be more efficiently used to fabricate the electrical devices using the CNTs, for example, field emission source, conductive wires, high performance conductive film, nano-electrode, and the like.

Figure 1:
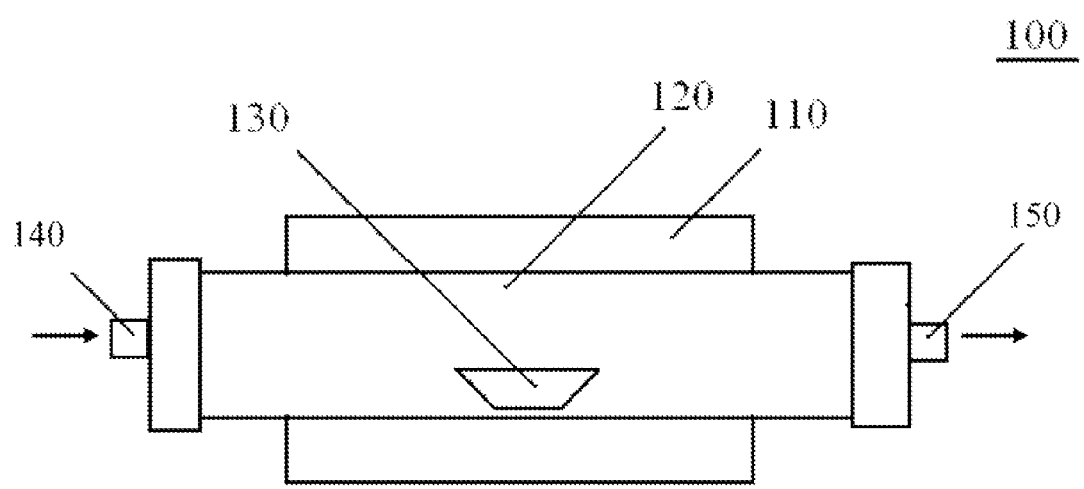
FIG. 1 is an exemplary reaction equipment that is used for implementing a treatment method according to an embodiment.

FIG. 1 shows an exemplary reaction furnace used for implementing the method according to an embodiment. The reaction furnace 100, for example, is the conventional Muffle furnace or the Chemical Vapor Deposition (CVD) furnace used to prepare the CNTs. The treatment method according to an embodiment is not limited to the type of the used reaction furnace, as long as the furnace has such a basic structure so as to implement the treatment method of the present application.

The reaction furnace 100 comprises a furnace body 110 and a reaction chamber 120, wherein the furnace body 110 has the control device for controlling the temperature of the reaction chamber 120, for example, resistance wire for heating, thermal couple for measuring the temperature, the control circuit and the like. The reaction zone with generally uniform temperature can be obtained, for example, at the middle segment of the reaction chamber 120, when the equipment is in operation. The reaction chamber 120 may be a tube that is resistant against high temperature and $SO_3$ etching, e.g., a quartz tube and the like. The reaction chamber 120 is provided with one or more inlets 140 at the front end and one or more outlets 150 at the back end. In addition, a reaction vessel for loading the CNTs to be treated, for example, a quartz boat 130, may further be provided in the reaction chamber 120.

The CNTs to be treated may be prepared by the conventional methods, such as arc-discharging method, CVD method, or laser evaporation method. However, the present application is not limited to the method for preparing the CNTs. In addition, the CNTs to be treated may be SWNTs, or MWNTs such as double-walled nanotubes (DWNTs) or CNTs with more carbon atom layers or the mixture thereof, and these CNTs may include both metallic CNTs and semiconducting CNTs mixed together.

The CNTs to be treated may first be dispersed with solvent, for example, ethanol, so as to decrease aggregation and increase the adhesive force with the quartz boat 130. The suspension is then transferred to the quartz boat 130 as the reaction vessel, and then drying and evaporation are performed to remove the ethanol, and thus the CNTs which can be further treated can be obtained. However, the pre-treatment is not necessary, and if the CNTs powders to be treated can adhere to the quartz boat 130 steadily, the pre-treatment can be simplified or omitted.

The quartz boat 130 loaded with CNTs after pre-treatment is put into the reaction zone (e.g., the middle segment) of the reaction chamber 120. Because the oxygen in the air has ablation effect on the CNTs under at an elevated temperature, it is generally necessary to preclude the oxygen gas (or air) in the reaction chamber 120 and achieve an environment substantially without oxygen. For this, the reaction chamber 120 is first pumped out to vacuum and backfilled with inert gases such as argon (Ar) to the ordinary pressure. This step can be repeated for several times (for example, three times) so that the air and moisture originally in the reaction chamber 120 can excluded outside. In addition to Ar, other inert gas may be used, for example, helium (He), nitrogen ($N_2$), and the like.

The temperature of the reaction zone (the middle segment) of the reaction chamber 120 is increased to an elevated temperature, for example, 385° C. to 475° C., and then $SO_3$ gas is supplied to the reaction chamber 120, and the reaction continues for 10 minutes to 2 hours for example, and then the supply of $SO_3$ gas to the reaction chamber is stopped. At this time, the gas treatment is completed. After that, under the inert gas atmosphere or with the reaction chamber 120 being again pumped to vacuum, the CNTs after the gas phase reaction treatment described above can be cooled down to room temperature naturally, or the treated CNTs may be further annealed.

In the treatment method according to an embodiment described above, the elevated temperature may be in the range of 385° C. to 475° C., preferably 400° C. to 450° C., and more preferably 410° C. to 440° C., for example, 413° C., 425° C. and 437° C. When the temperature is below 385° C., the reaction runs slowly. When the temperature is higher than 500° C., the remained product is small, and this may be attributed to the fact that $SO_3$ gas may have started decomposing to generate oxygen, and thus generated oxygen gives rise to ablation on the CNTs treated at the elevated temperature.

In the treatment method according to an embodiment described above, the reaction time may be 10 minutes to 2 hours, preferably 30 minutes to 1 hour, for example, 45 minutes. If the reaction time is less than 10 minutes, there is the treatment effect but not apparent, whereas if the reaction time is longer than 2 hour, the remained CNTs will be small.

The $SO_3$ gas may be supplied with the inert gas such as Ar as the carrier gas bubbling through oleum, and $SO_3$ gas also can be supplied by other known methods in the art, for example by oxidation of $SO_2$ gas. The partial pressure of the $SO_3$ gas in the reaction zone is preferably 8% to 30% in reaction. The inlet of the reaction chamber 120 for supplying $SO_3$ (and the carrier gas) and the inlet for supplying Ar to exclude the air may be the same one or separated two. The partial pressure of the $SO_3$ gas can be controlled by controlling the flow rate of the $SO_3$ gas with a valve (not shown) provided at the inlet.

After the reaction is completed, anneal can be performed on the CNTs treated with $SO_3$ in the same reaction chamber 120. The anneal temperature may be in the range of 800° C. to 1000° C., for example 900° C., with the time of 10 minutes to 30 minutes. The anneal can remove the $SO_3$ gas molecules absorbed on the wall of the remained metallic CNTs and repair the damages such as holes which are etched by the $SO_3$ gas on wall of the metallic CNTs during the reaction, and therefore the products with better quality can be obtained.

Example 1

6 mg HiPco SWNTs are dispersed in the ethanol with ultrasonic for 10 minutes to eliminate aggregation and to remove impurities, and then the suspension is transferred to the quartz boat 130 and is dried and evaporated at 90° C. to remove the ethanol, resulting in the SWNTs which are to be further treated. The quartz boat 130 loaded with the dried SWNTs is put into the middle segment of the reaction chamber 120 with a diameter of 22 nm of the reaction furnace 100. The reaction chamber 120 is pumped out to vacuum of $10^{-3}$ Torr, and then Ar is backfilled. The operations of pumping out and backfilling are repeated three times to substantially remove the residual air and moisture in the reaction chamber 120. Next, the reaction chamber 120 is rapidly heated to 425° C., and then $SO_3$ gas is supplied by bubbling Ar (120 sccm) as the carrier gas into a bottle filled with oleum (not shown). After 45 minutes, the supply of $SO_3$ gas is stopped. The reaction chamber 120 is again pumped out to vacuum and cooled down to room temperature naturally. Finally, about 2.4 mg remaining SWNTs that has been subjected to the treatment reaction are obtained.

Herein, HiPco (High pressure-carbon monoxide) SWNTs treated can be purchased from Carbon Nanotechnologies Inc. (USA). The Hipco SWNTs are prepared with the decomposition of the carbon monoxide (CO) under the high temperature and high pressure using iron (Fe) as catalyst, the ratio of the metallic SWNTs in which is originally about 37%.

Testing and Analysis

The characteristics of the SWNTs obtained in the above example are tested and analyzed with Raman spectrum and near-infrared (NIR) absorption spectrum.

Before the Raman spectrum is performed, in order to preclude the influence of aggregation state of the SWNTs on the testing results, all the samples used for the Raman spectrum can be treated first as follows: the samples are sonicated in ethanol for 5 min or more, and then the suspension is collected and dropped on a glass slide and dried in air.

FIGS. 2a-2d show the Raman spectra of the samples (JY LabRam HR800). In the Raman spectra, the diameters and (n, m) indexes of the CNTs are all determined from the revised Kataura plot introduced in Michael S. Strano *J Am. Chem. Soc.* 2003, 125, 16148 by Strano. The (n, m) index is called as chiral vector and may be used to determine the structure of the SWNTs, and the conductivity of the SWNTs also may be determined with this index.

In Raman spectrum, Radial-Breathing Mode (RBM) corresponding to one of the feature diffraction mode of the SWNTs appears in the low frequency of 130 $cm^{-1}$ to 350 $cm^{-1}$. The frequency of the RBM mode is inversely-proportional to the diameter of the SWNTs, and the relation can be expressed as $\omega=223.75/d+6.5$ (for example, refer to Lyu, S. C.; Liu, B. C.; Lee, T. J.; Liu, Z. Y.; Yang, C. W.; Park, C. Y.; Lee, C. J., *Chem. Commun.* 2003, 734), wherein, $\omega$ is RBM frequency with $cm^{-1}$ as unit, d is the diameter of the SWNTs with nm as unit, and the aggregation effect is also considered therein. The RBM frequency of 130 $cm^{-1}$ to 350 $cm^{-1}$ corresponds to the diameter of 0.6 nm to 1.8 nm. However, the shoulder peak of 1552 $cm^{-1}$ appearing at the left of the main peak of 1586 $cm^{-1}$ (G Band) is attributed to the split of the $E_{2g}$ mode of the graphite. Moreover, the shoulder peak is also one of the feature diffraction mode of the SWNTs (for example, refer to A. Kasuya, Y. Sasaki, Y. Saito, K. Tohji, Y. Nishina, *Phys. Rev. Lett.* 1997, 78, 4434). In addition to these feature peaks, the peak appearing at 1320 $cm^{-1}$ corresponds to the mode induced by the defect, i.e., D band, and this corresponds to the defects of amorphous carbon and the like included in the sample. Moreover, the G/D ratio is the indicator for evaluating the purity of the SWNTs, and the ratio is increased with the increase of the purity of the SWNTs (for example, refer to H. Kataura, Y. Kumazawa, Y. Maniwa, Y. Ohtsuka, R. Sen, S. Suzuki, Y. Achiba, *Carbon* 2000, 38, 1691).

Figure 2A:
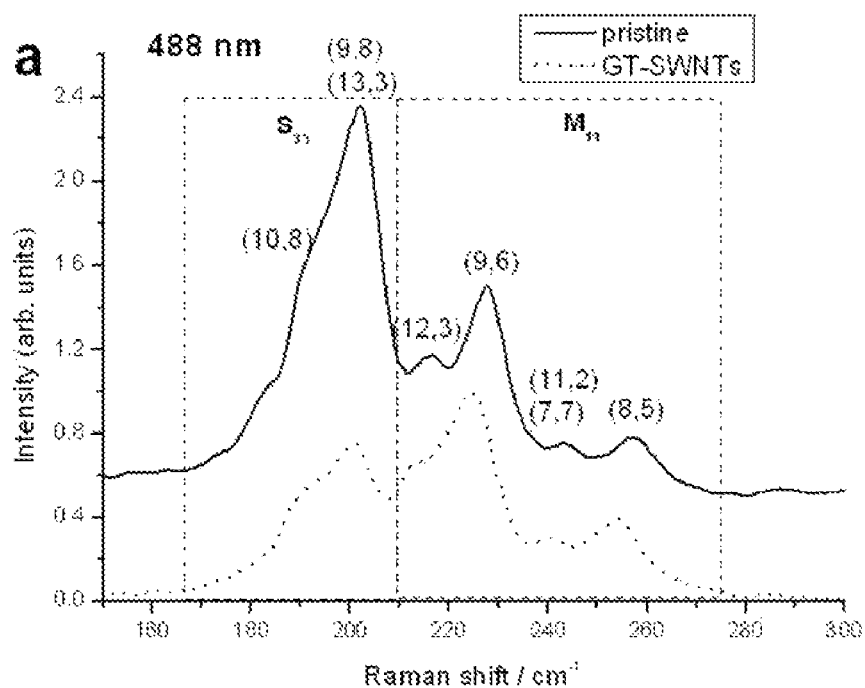
FIGS. 2a-2d are the Raman spectra of the treated SWNTs in example 1.
Figure 2B:
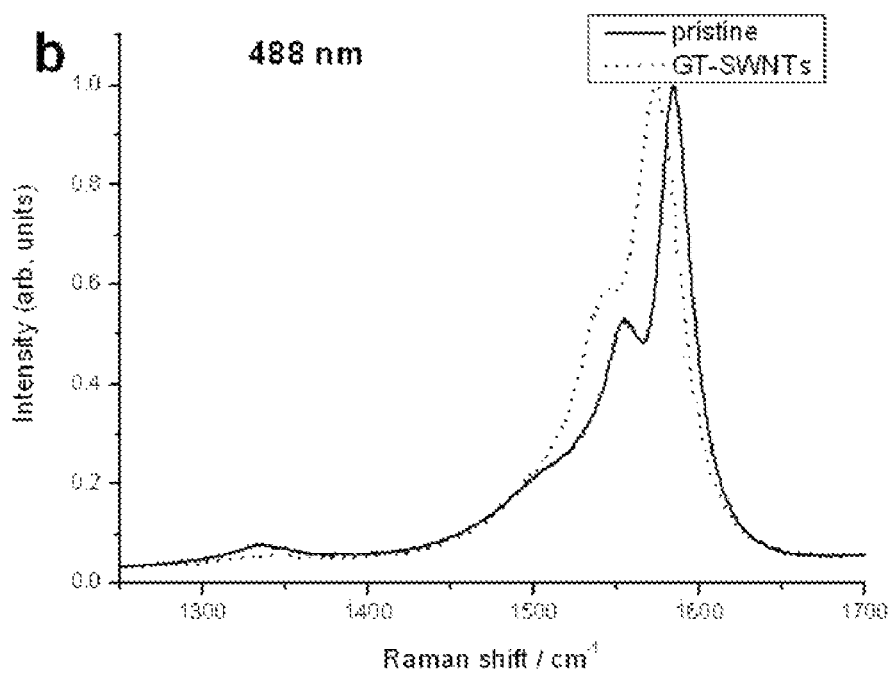
Figure 2C:
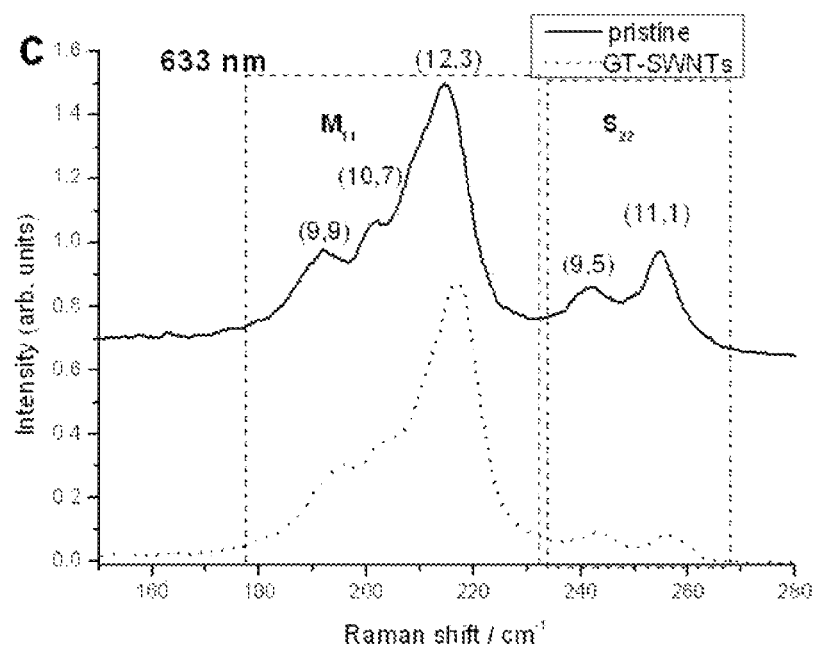

In FIGS. 2a-2d, for the SWNTs with diameter less than 1.10 nm (RBM frequency: about 215-300 $cm^{-1}$), the metallic SWNTs are detected with excitation wavelength of 488 nm (FIG. 2a); using the excitation wavelength of 633 nm, the metallic SWNTs (12, 3) and the semiconducting SWNTs (9, 5) and (11, 1) will show Raman signals (FIG. 2c). It can be seen from FIG. 2c that the semiconducting SWNTs with diameter less than 1.10 nm are almost completely removed. However, as shown in FIGS. 2a and 2c, the metallic SWNTs (12, 3), (9, 6), (11, 2) and (8, 5) are all preserved. Especially the semiconducting SWNTs (11, 1) with diameter of 0.916 nm are remarkably removed (FIG. 2c), whereas the metallic SWNTs (8, 5) with slightly smaller diameter of 0.902 nm are preserved as the starting SWNTs (FIG. 2a).

It can be seen from the above analysis, the $SO_3$ gas treatment according to an embodiment is of conductivity and diameter selectivity. Moreover, this effect can be confirmed by the significant decrease of the peaks originating from the semiconducting SWNTs with diameters larger than 1.10 nm in FIG. 2a, as well as the remained intensity of the peaks originating from their metallic counterparts in that region as shown in FIG. 2c.

Figure 2D:
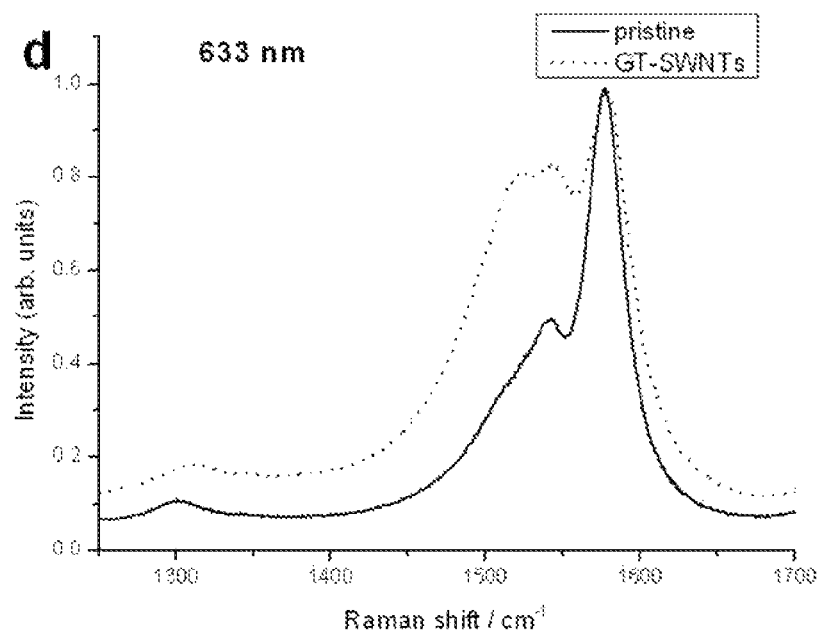

In addition, G band obtained by using excitation wavelength of 633 nm in FIG. 2d shows a slow decay back to the spectra baseline (asymmetrical Breit-Wigner-Fano (BWF) line shape), which is consistent with the fact that the resonant semiconducting SWNTs are removed effectively. However, G band obtained by using excitation wavelength of 488 nm in FIG. 2b shows a downshift, which suggests that a charge transfer from the donor additions to the SWNTs. The treated SWNTs with little semiconducting SWNTs in FIG. 2d do not show this downshift of G band. Such downshift in FIG. 2b may be attributed to selective absorption of $SO_3$ on the remained semiconducting SWNTs in the resonant treated SWNTs under the excitation wavelength of 488 nm.

By the above comparison, it is speculated that the possible principle of the treatment reaction according to an embodiment may be as follows. The structure of the planar molecular of $SO_3$ is:

The origin of the selective adsorption of $SO_3$ molecular with respect to the semiconducting SWNTs may come from preferential π-stacking of the planar $SO_3$ molecule which possesses π electrons with more aromatic semiconducting SWNTs. However, the adsorption of $SO_3$ molecular with respect to the metallic SWNTs is poorer. Therefore, the molecules of $SO_3$ absorb with the semiconducting SWNTs selectively, and further react with and destroy the carbon atom walls of the semiconducting SWNTs at elevated temperature. The destroyed CNTs may be first transformed into amorphous carbon, and the amorphous carbon is in turn transformed into gas such as $CO_2$ or $CO$, which is then discharged out of the reaction chamber 120. On the other hand, the absorption between the molecules of $SO_3$ and the metallic SWNTs is relatively weaker, and the desorption occurs more easily at high temperature and anneal may also occurs. Finally, the balance between absorption and desorption can be reached at the high temperature, and the carbon atom walls of the metallic SWNTs may not be destroyed remarkably. During the gas reaction, when the reaction temperature is higher than 475° C., especially higher than 500° C., the supplied $SO_3$ gas may have started to decompose and generate oxygen, and the generated oxygen has ablation effect on all the CNTs in the reaction, which causes a great decease of the yield of the reaction.

Figure 3A:
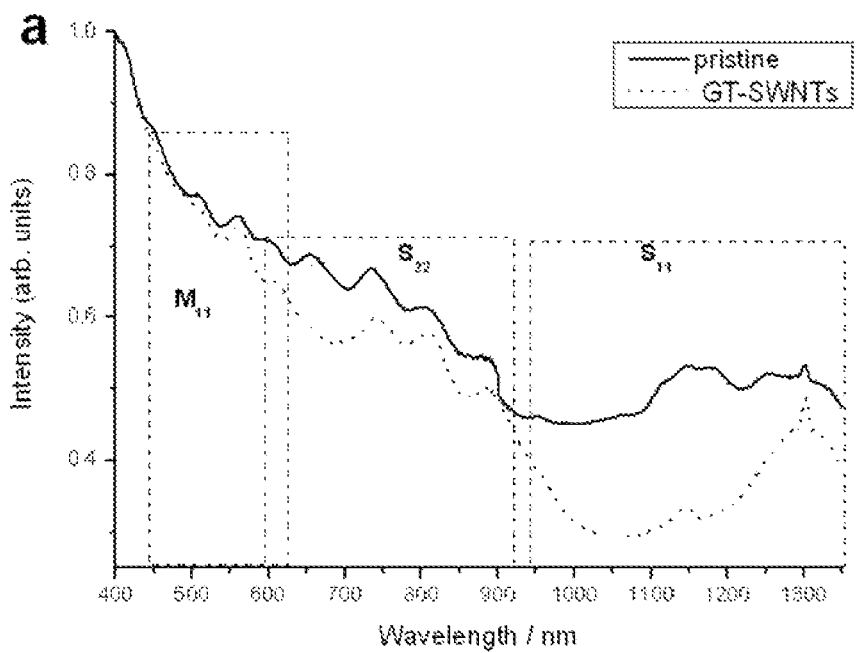
FIGS. 3a-3b are the near-infrared (NIR) absorption spectra of the treated SWNTs in example 1.

In addition, NIR absorption spectrum testing is performed on the treated SWNTs (JASCO V-570), and these tests can provide the information on the conductivity of all the CNTs in the samples. FIG. 3a shows that the absorption spectra of the starting SWNTs and the treated SWNTs, and for the meanings of each of the peaks in the FIGS. 3a and 3b, please refer to Woo-Jae Kim, Monica L. Usrey, and Michael S. Strano. Chem. Mater. 2007, 19, 1571. In FIG. 3a, M11 region corresponds to the metallic SWNTs, and S22 and S11 regions correspond to the semiconducting SWNTs, It can be seen form FIG. 3a that, after the treatment according to an embodiment, the intensity of the peaks in S11 and S22 regions of the treated SWNTs is remarkably decreased, while the intensity of the peaks in M11 region does not change, which means that the semiconducting SWNTs are selectively removed, while the metallic SWNTs are preserved.

Figure 3B:
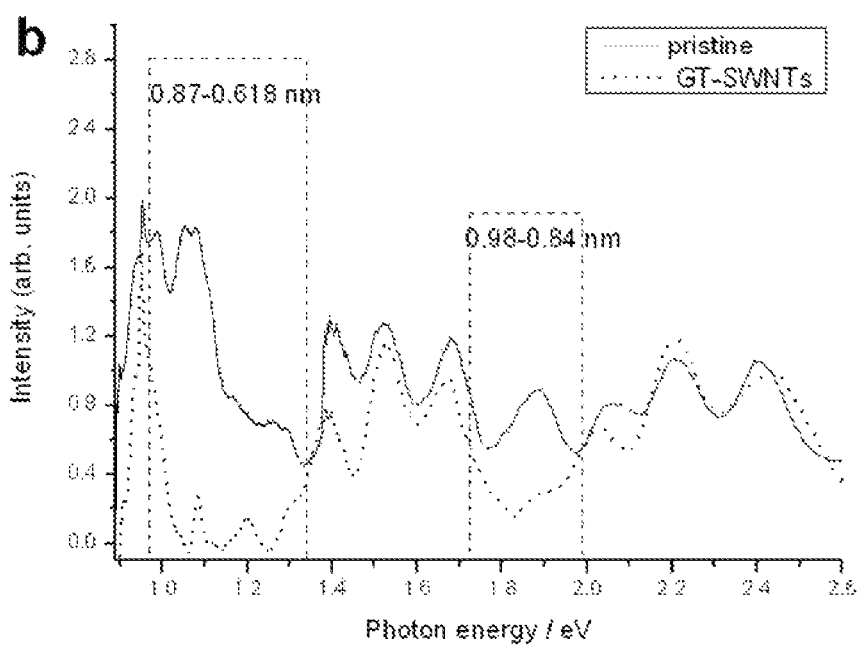

In order to determine the separation efficiency of the treatment according to an embodiment on the CNTs of different conductivity, a baseline correction and assignments of the diameter range of the peaks at near 1.1 eV and 1.8 eV (FIG. 3b), which correspond to transitions between the first (S11) and second (S22) van Hove singularities respectively, are performed on the treated SWNTs. Because the S11 band may be disturbed more easily than S22 Band, first the S22 region around 1.8 eV with the diameter range that is written in the dash line rectangle in FIG. 3b is used to evaluate the remove efficiency of the semiconducting SWNTs. As shown in the FIG. 3b, the peaks corresponding to semiconducting SWNTs with diameter of 0.84 nm to 0.98 nm have almost disappeared. Since the S22 region with band gap higher than 2.0 eV, which is related to the CNTs with diameter smaller than 0.84 nm, overlaps with M11 region, S11 region that is in the dash line rectangle near 1.1 eV is used to determine the remove efficiency of the semiconducting SWNT with diameter of 0.6 nm to 0.84 nm. In the S11 region, the peaks are remarkably decreased. It can be concluded that in the SWNTs with diameter of 0.6 nm to 0.98 nm, the semiconducting CNTs are very efficiently removed.

According to the calculation to the relative area of the absorption peaks, in the method according to an embodiment, about 95% of the semiconducting SWNTs with diameter less than 1 nm are removed. While for the semiconducting SWNTs with diameter of larger than 1 nm, it can be evaluated from the relative intensity of the Raman spectra in FIG. 2a that the ratio of the semiconducting SWNTs is decreased from 66% to 34%. Thus, as a whole about 75% of the semiconducting SWNTs are removed.

In the method according to an embodiment, the metallic SWNTs are preserved more than the semiconducting SWNTs after the treatment, and this phenomenon is contrary to the conventional view and gives rise to unexpected effect. In the conventional view, it is generally considered that since the metallic SWNTs have more abundant electron charge density at Fermi level than the semiconducting SWNTs, the metallic SWNTs should be more active in chemical reaction and therefore more easily be etched away. However, since the $SO_3$ gas is selectively absorbed to the semiconducting SWNTs in the gas phase reaction and etches the semiconducting SWNTs, the metallic SWNTs are instead more inert and preserved in the gas phase reaction.

The Second Embodiment

Carbon nanotube (CNT) transparency conducting films, consisting of CNT networks, especially of SWNT networks, have recently attracted much attention because individual CNT's variation such as diameter and chirality can be suppressed by the ensemble averaging over a great number of CNTs. The conductivity of the film can be determined by many factors such as contact resistance between CNTs, metallic CNT content in the network. Therefore, in order to obtain the CNT film with high conductivity, it is needed to minimize the contact resistance between CNTs and also to increase the content of metallic CNTs in the network. Therefore, the CNT transparency conducting films can be fabricated using the treated CNTs according to the embodiment.

In the second embodiment, CNT transparency conducting films are prepared by using the CNTs treated by $SO_3$ gas at an elevated temperature, and the characteristics are tested and analyzed.

Example 2

As-received HiPco SWNT sample (Carbon Nanotechnologies, Inc.) is used as a starting material. The SWNT sample is treated with $SO_3$ gas at 400° C. and 425° C. One milligram of the sample is dispersed in 50 ml of 1.0 wt % sodium dodecyl sulfate (SDS, Biochain Institute Inc., Cat#Z5050012) aqueous solution for 20 minutes using a horn sonicator (Nihonseiki Kaisha Ltd., Model US-300T). The solution is then centrifuged at 50,000 g at 25° C. for 1 hour (Sigma, Model 3K30C), and the upper clear part of the solution is vacuum filtered through a mixed cellulose ester membrane filter (Millipore GSWP02500, dia. 25 mm, pore size 0.22 μm). As the solution falls through the pores, the CNTs are trapped on the surface of the membrane filter, forming a CNT film. The residual SDS in the film is washed away with distilled water.

The CNT film with the membrane filter is placed in contact with a quartz substrate. The membrane filter is covered with porous paper and a flat glass plate, which are compressively loaded to keep the film flat when dried at 90° C. in less than $10^2$ Pa (=1 mbar) for 1 hour. The membrane filter is removed by dipping in acetone, and then the CNT film is heated at 150° C. in less than $10^2$ Pa for 5 hours to remove acetone and to improve adhesion of the film on the substrate. The film is finally heated at 900° C. in less than $10^{-2}$ Pa for 30 minutes.

Sheet resistance and transparency of the CNT film are measured using a resistive meter with a 4-pin probe (Mitsubishi Chemical Co., LORESTA-EP MCP-T360 and MCP-TP06P) and a spectrophotometer (Hitachi, U-4000), respectively. Raman spectrum is measured with the excitation wavelength of 473 nm (Thermo Electron Corporation, Nicolet Almega XR dispersive Raman). The morphology of the samples is observed using a scanning electron microscopy with an accelerating voltage of 3 kV (SEM, JEOL, JSM-6700F).

Testing and Analysis

Figures 4A, 4B, 4C:
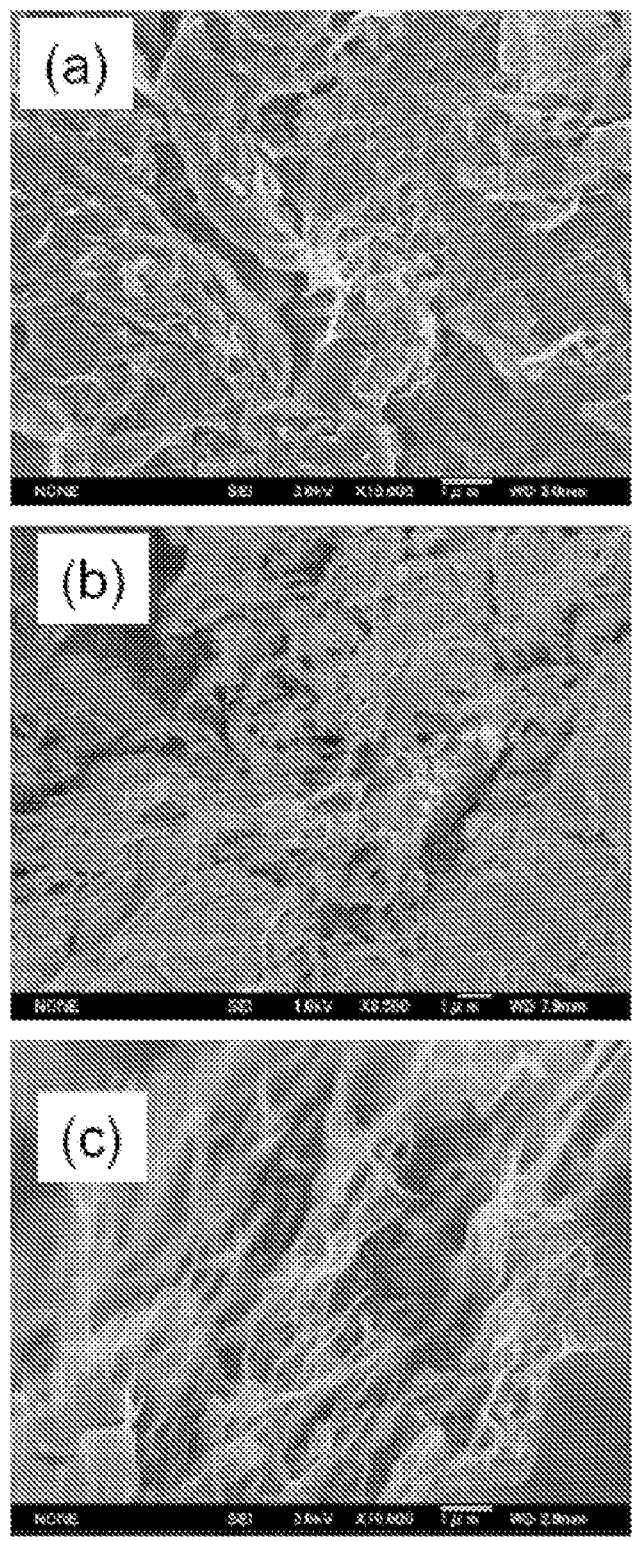
FIGS. 4a-4c show the SEM photos of the starting SWNTs sample, the SWNTs sample treated by $SO_3$ and the SWNTs sample further annealed at 900° C., respectively, in example 2.

FIGS. 4a-4c show the SEM images of the SWNT samples in various stages according to the Example 2, respectively. As shown, the starting SWNT sample mainly consists of the bundles of SWNTs (FIG. 4a). No significant changes in morphology are observed after the $SO_3$ treatment (FIG. 4b) and also after the anneal treatment at 900° C. (FIG. 4c).

Figures 5A, 5B, 5C:
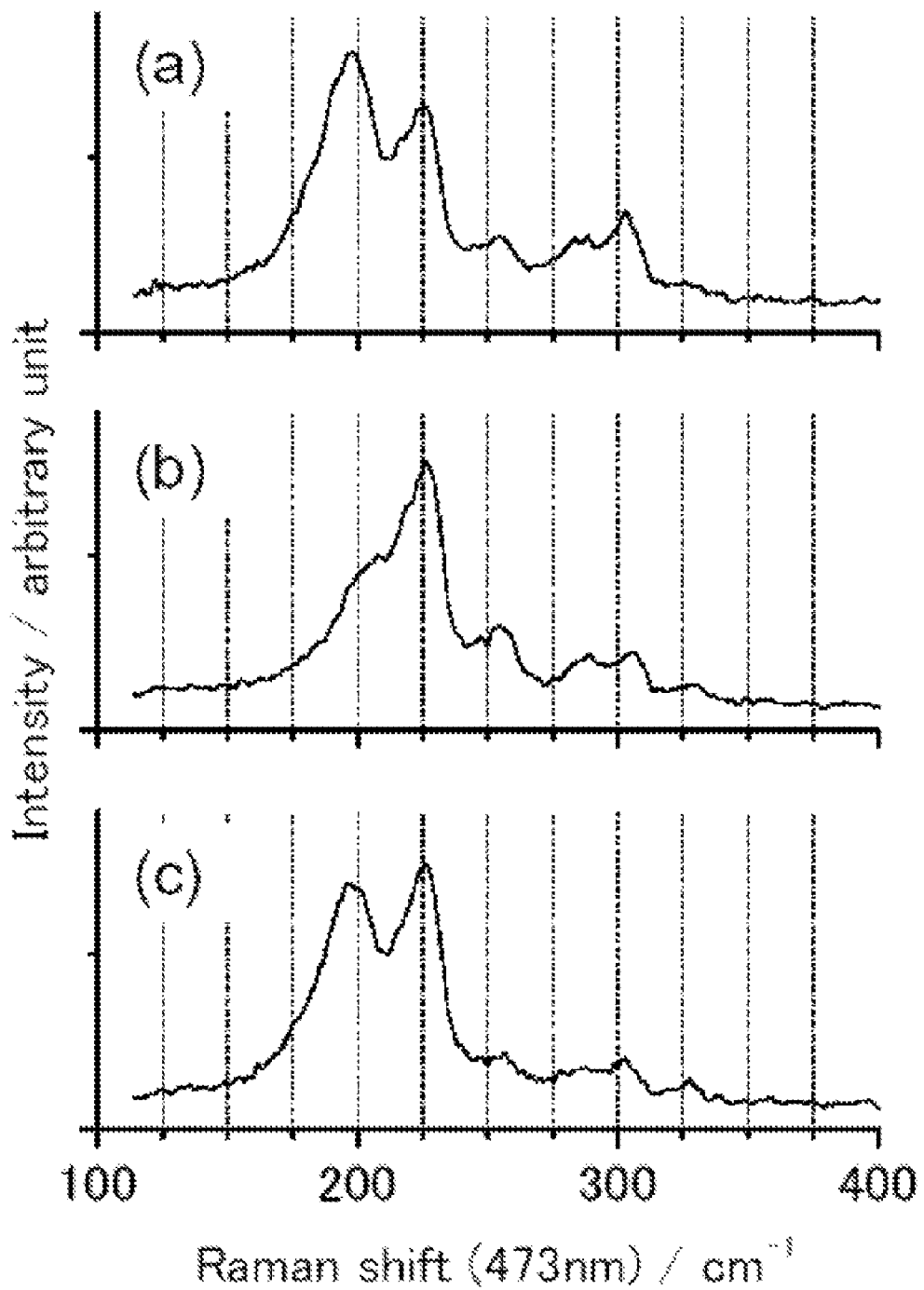
FIGS. 5a-5c show the Raman spectra of the starting SWNTs sample, the SWNTs sample treated by $SO_3$ and the SWNTs sample further annealed at 900° C., respectively, in example 2.

FIGS. 5a-5c show Raman spectra of the starting SWNT sample, the SWNT samples treated with $SO_3$ and the samples further annealed at 900° C. The RBM of the SWNTs can be clearly observed in the frequency between 100 and 400 $cm^{-1}$. With the excitation wavelength of 473 nm, the RBM originating from semiconducting SWNTs can be detected from 150 to 220 $cm^{-1}$ (1.0<d<1.6 nm) and from 350 to 400 $cm^{-1}$ (0.6<d<0.7 nm). The intensity of RBM at 198 $cm^{-1}$, originating from semiconducting SWNTs with a diameter of 1.2 nm, decreases after the $SO_3$ treatment, implying that these semiconducting SWNTs are partially removed or damaged by $SO_3$ gas so that the Ramma signals response disappear. This Raman spectrum is consistent with the optical absorption results of the above example 1. Since the SWNTs with smaller diameter has higher strain energy, such SWNTs has higher reactivity. The intensity of RBM at above 250 $cm^{-1}$ (d<1.0 nm) decreases after the $SO_3$ treatment.

After the anneal treatment at 900° C., the peak intensity at 198 $cm^{-1}$ increases again to some extent, while the peak originating from the metallic SWNTs keeps unchanged, which indicates that the anneal at 900° C. may repair a portion of the semiconducting SWNTs that has been partially damaged by the $SO_3$ treatment, while the metallic SWNTs almost are not damaged by the $SO_3$ treatment, and thus the peak for these metallic SWNTs does not increase due to the reparation. This complies with the fact that the semiconducting SWNTs are preferentially damaged and removed by the $SO_3$ treatment as described above.

Figures 6A, 6B, 6C:
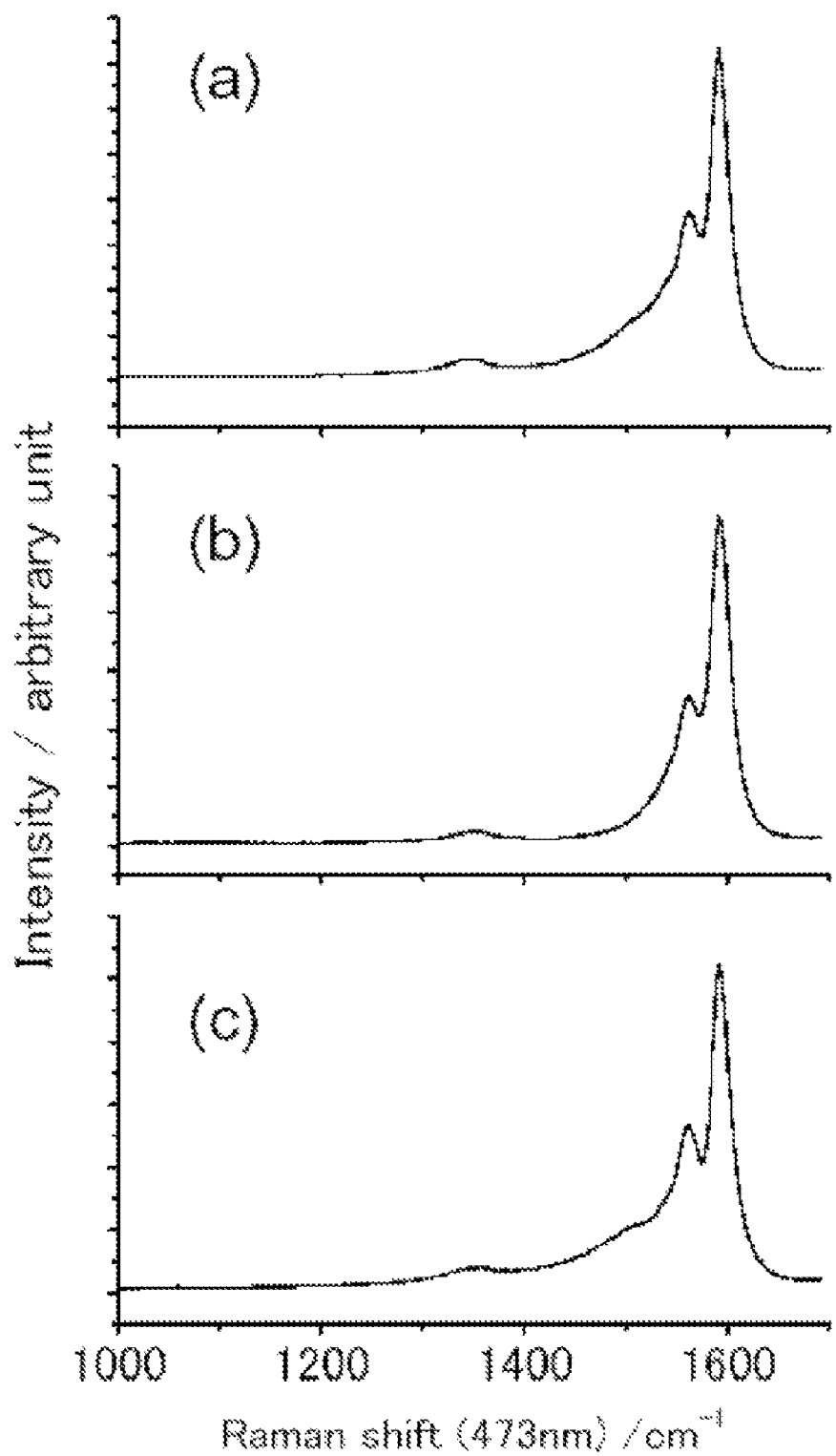
FIGS. 6a-6c show the Raman spectra of the starting SWNTs sample, the SWNTs sample treated by $SO_3$ and the SWNTs sample further annealed at 900° C., respectively, in example 2.

As described above, the intensity ratio of the G-band at 1590 $cm^{-1}$ ($E_{2g}$ mode of graphite, $I_{1590}$) to the D-band at 1350 $cm^{-1}$ (defective induced mode, $I_{1350}$), $G/D=I_{1590}/I_{1530}$, can be a good measure of the content and purity of the SWNTs in the samples, and this value decreases with the decrease of the SWNT content and/or with the increase of the amorphous carbon content. FIG. 6a-6c show the Raman spectra of the starting SWNTs sample, the SWNT sample treated by $SO_3$ and the SWNT sample annealed at 900° C. in example 2, respectively. As shown in the FIGS. 6a-6c, the G/D value increases from 19 to 27 by the $SO_3$ treatment, and decreased to 20 after the anneal treatment at 900° C. This suggests that a part of amorphous carbon is removed during the $SO_3$ treatment, but the remained membrane filter that is used to prepare the conducting film is carbonized by the oxygen originating from the decomposition of the absorbed $SO_3$ molecules during the anneal treatment at 900° C., introducing new amorphous carbon into the sample. Since this anneal treatment is done in less than $10^{-2}$ Pa, the produced amorphous carbon cannot be removed by oxidation during the anneal treatment, resulting in the decrease of the G/D value.

Figure 7:
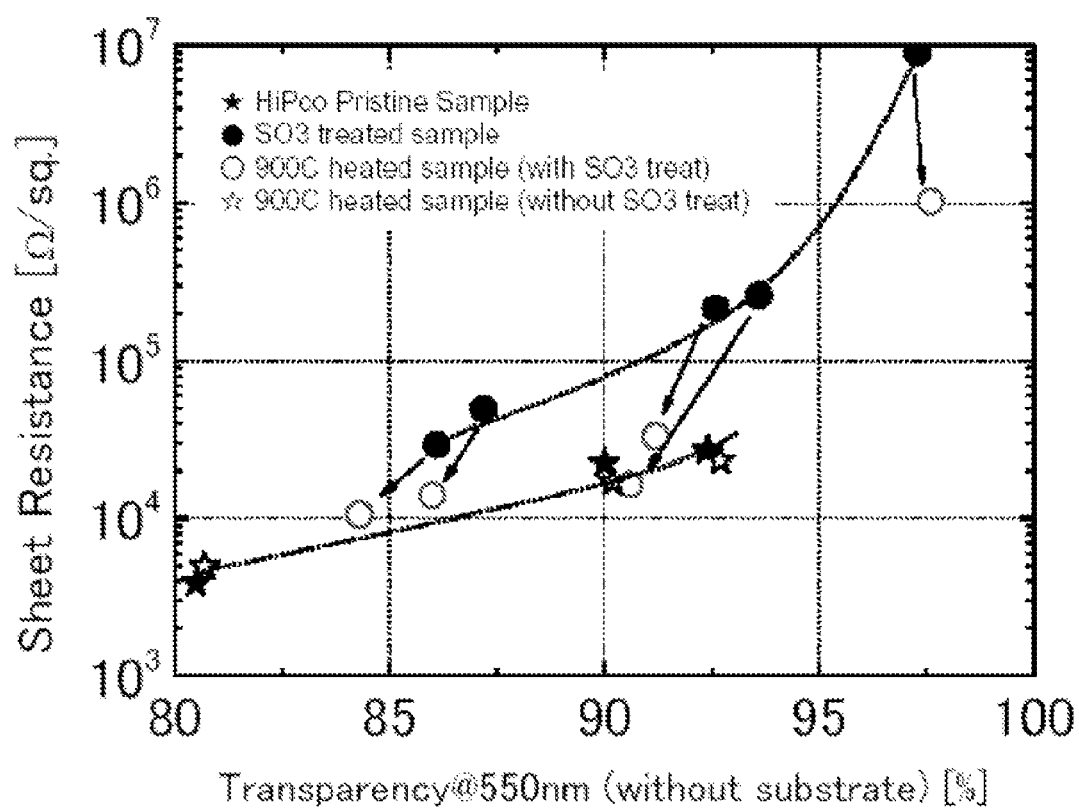
FIG. 7 shows the sheet resistance as a function of the transparency at 550 nm in example 2.

FIG. 7 shows sheet resistance as a function of the transparency at 550 nm in example 2. The CNT film prepared using the $SO_3$ treated SWNT samples shows relatively higher sheet resistance than those prepared from the starting sample. After the $SO_3$ treatment, SWNTs are covered with $SO_3$ molecules and thus the contact resistance between SWNTs is increased due to the absorbed $SO_3$ molecules, resulting in the increase of the sheet resistance. After the anneal treatment at 900° C., sheet resistance decreases remarkably, the reasons for which include that the absorbed $SO_3$ molecules are removed due to the anneal reducing the contact resistance between the SWNTs, the partially damaged SWNTs are repaired, and the metallic SWNTs are enriched in the treated sample. For example with respect to the transparency of 90%, the sheet resistance is reduced from 22,400 ohm/sq. to 16,300 ohm/sq. On the other hand, the transparency of the conducting film treated by the $SO_3$ gas decreases by 3 percentage, and this decrease of transparency may attribute to the amorphous carbon produced during the anneal treatment at 900° C. As discussed above, the residual membrane filter used to prepare the conducting film gives rise to the amorphous carbon due to ablation of the oxygen from the decomposition of $SO_3$ molecules at the elevated temperature, and it can be expected that the sheet resistance can be further reduced if this amorphous carbon is effectively removed.

Thus, the transparent conductive film with increased sheet resist is obtained with the CNTs treated with $SO_3$ gas according to the second embodiment.

The Third Embodiment

In the third embodiment, the CNTs treated with $SO_3$ at an elevated temperature are used to fabricate the CNT film served as field emission source for a filed emission display (FED). The fabrication of the carbon nanotube thin film can be done as follows.

The CNTs treated according to the embodiment are dispersed in ethanol with ultrasonic for 5 hours, and then the ethanol is removed through volatilization. The mixture of terpilenol and cellulose with mass ratio of 95%:5% is used as organic solvent and is mixed with the dispersed CNTs to produce slurry for silk screen printing, in which the mass ratio between the organic solvent and CNTs is, for example, 3:2.

The slurry is printed on a glass substrate by silk screen printing to form the desired pattern, and then is sintered. Subsequently, the sintered CNTs are activated. First, the surface of the CNT film is slightly polished or etched and the terminals of the CNTs are exposed; then, ion etching may be performed on the CNTs to increase the ability for emitting electrons. In order to improve the conductivity of the thin film of CNTs, silver powder may be added into the slurry for printing.

In the FED, the CNTs serve as the cathode and the indium tin oxide (ITO) thin film coated with a layer of fluorescent powder serves as the anode, and the cathode and the anode are separated from each other by about 15 mm with barrier ribs disposed therebetween. Under the control of control circuit, for example, a voltage can be applied between the cathode and the anode, the electrons can be emitted from the CNTs as the cathode, and the emitted electrons are forced to the anode and activate the fluorescent layer to display image.

With the treatment method according to an embodiment, the separation for CNTs of different conductivity is performed and the metallic CNTs can be enriched, and hence the enriched metallic CNTs can be further used for various electronic devices, for example, a conductive film and a field emission source and also can be used in other types of CNT device, such as a transistor, a conductive wire, a electrode material (e.g., transparent, porous and gas diffusing material), a nano electro-mechanic system (NEMS), a nano cantilever, a quantum computing device, a lighting emitting diode, a solar cell, a surface-conduction electron-emitter display, a filter (e.g., high-frequency or photonic band), a drag delivery system, a thermal conductive material, a nano nozzle, an energy storage material (e.g., hydrogen storage material), a fuel cell, a sensor (e.g., gas, glucose, or ion sensor), or a catalyst support material, which use the treated CNTs according to an embodiment. Another embodiment relates to using the above treated CNTs to fabricate carbon nanotube devices.

The Fourth Embodiment

In the forth embodiment, the selective treatment is performed on CNTs at an elevated temperature using nitrogen oxide ($N_xO_y$) gas, which enables the separation of the metallic and semiconducting CNTs. The device used in the embodiment for the treatment can be similar to that shown in FIG. 1. The nitrogen oxide includes nitrous oxide ($N_2O$), nitric oxide (NO), nitrogen dioxide ($NO_2$), nitrogen tetroxide ($N_2O_4$), nitrogen pentoxide ($N_2O_5$), or the mixture thereof, preferably nitric oxide, nitrogen dioxide, or the mixture thereof.

Although the above description is made with respect to the SWNTs that are treated in the above examples, it should be understood by those skilled in the art that the treatment method of the present application will produce the same effect on MWNTs, especially the MWNTs with small diameter and relatively small number of walls (two layers or three layers, for example), and enables the separation of the metallic MWNTs and semiconducting counterparts and selective removal of the CNTs with different diameters.

The method for treating the CNTs according to an embodiment at least has the following advantages. First, the content of metallic CNTs, especially metallic CNTs with small diameter, is increased, resulting in the separation of the metallic and semiconducting CNTs. Second, the high temperature treatment during the reaction has the anneal effect to remove the functionalized groups on the wall of the CNTs and repair the defects on the CNTs. Third, the treatment method of the present application does not need the complicated post-treatment such as centrifugal separation. Fourth, the impurities such as amorphous carbon can be removed in the reaction and thus purify the CNTs.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A method for treating carbon nanotubes (CNTs), comprising:
    treating the CNTs with sulfur trioxide gas at a temperature between 385° C. and 475° C. in an environment substantially without oxygen by pumping out to vacuum and backfilling with an inert gas to standard pressure prior to treatment.

2. The method according to claim 1, wherein the temperature ranges from 400° C. to 450° C.

3. The method according to claim 1, wherein the treating is performed for 10 minutes to 2 hours.

4. The method according to claim 3, wherein the treating is performed for 30 minutes to 1 hour.

5. The method according to claim 1, further comprising:
    annealing the CNTs that have been treated with the $SO_3$ gas.

6. The method according to claim 5, wherein the annealing is performed at an anneal temperature ranging from 800° C. to 1000° C.

7. The method according to claim 5, wherein the annealing is performed for 10 minutes to 30 minutes.

8. The method according to claim 1, wherein the CNTs are single-walled carbon nanotubes or double-walled carbon nanotubes.

9. The method according to claim 1, wherein an inert gas is used as a carrier gas for supplying the $SO_3$ gas.

10. The method according to claim 1, wherein a partial pressure of the $SO_3$ gas is 8% to 30% during the treating.

11. A method for treating carbon nanotubes (CNTs), comprising:
    treating the CNTs with a nitrogen oxide gas at a temperature between 385° C. and 475° C. in an environment substantially without oxygen by pumping out to vacuum and backfilling with an inert gas to standard pressure prior to treatment.

12. A method for treating carbon nanotubes (CNTs), comprising:
    treating the CNTs with a planar molecular gas at a temperature between 385° C. and 475° C. in an environment substantially without oxygen by pumping out to vacuum and backfilling with an inert gas to standard pressure prior to treatment.

* * * * *